United States Patent [19]

Porcham

[11] Patent Number: 4,615,872

[45] Date of Patent: Oct. 7, 1986

[54] PROCESS FOR PRODUCING SILICON TETRAFLUORIDE

[75] Inventor: Wolfgang Porcham, Mils, Austria

[73] Assignee: D. Swarovski & Co., Austria

[21] Appl. No.: 716,390

[22] Filed: Mar. 27, 1985

[30] Foreign Application Priority Data

Sep. 5, 1984 [DE] Fed. Rep. of Germany ....... 3432678

[51] Int. Cl.$^4$ ............................................. C01B 33/08
[52] U.S. Cl. .................................................... 423/341
[58] Field of Search ........................................ 423/341

[56] References Cited

U.S. PATENT DOCUMENTS

| | | | |
|---|---|---|---|
| 1,247,165 | 11/1917 | Stahl | 423/341 |
| 2,833,628 | 5/1958 | Molstad | 423/341 |
| 2,933,374 | 4/1960 | Cook | 23/204 |
| 3,674,431 | 7/1972 | Driscoll | 423/341 |
| 3,754,077 | 8/1973 | Kruger | 423/341 |
| 3,969,485 | 7/1976 | Flemment | 423/337 |
| 4,262,409 | 4/1981 | Madej | 29/526 R |
| 4,282,196 | 8/1981 | Kometani | 423/341 |

OTHER PUBLICATIONS

Roederer, "Nouveau Beton Resistant a la Corrosion", *Chimie & Industrie*, (Paris) 84, 912–924 (1960).
Sanjurjo et al, "Silicon by Sodium Reduction of Silicon Tetrafluoride", *J. Electrochem. Soc.* 128 (1981) 179–184.
Konagai et al, "Amorphous Si-F-H Solar Cells prepared by dc Glow Discharge", *Appl. Phys. Lett.* 36 (1980) 599.
Madan, et al, "Electrical and Optical Properties of Amorphous Si:F:H Alloys", *Phil. Mag.* B40, 159 (1979).
Padma, et al, "Silicon Tetrafluoride: Preparation and Reduction with Lithium Aluminium Hydride", *J. Fluorine Chem.*, 1979, 14(4), 327–329.
"Hydrogen Fluoride and Pyrogenic Silica from Fluosilicic Acid", Proc.-Fert. Soc. (PFRSAZ), V 163, 1977.

*Primary Examiner*—Peter D. Rosenberg
*Attorney, Agent, or Firm*—Bacon & Thomas

[57] ABSTRACT

A process for producing silicon tetrafluoride by hydrolysis of gases containing silicon fluoride, the hydrolysate being reacted with sodium fluoride, potassium fluoride and/or barium fluoride and the reaction product obtained decomposed thermally, thereby forming silicon tetrafluoride.

2 Claims, 1 Drawing Figure

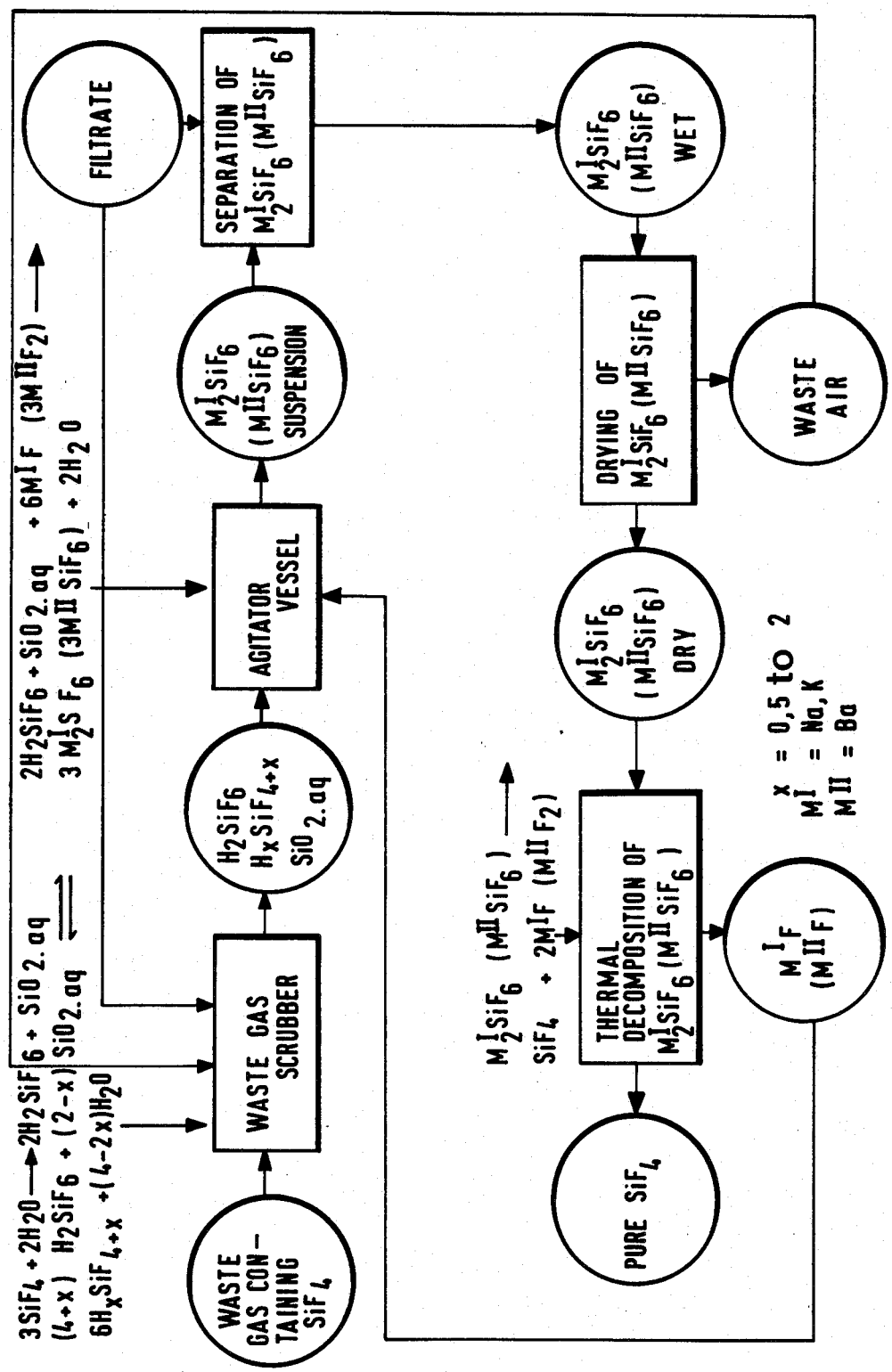

PROCESS FOR PRODUCING SILICON TETRAFLUORIDE

The invention relates to a process for producing pure silicon tetrafluoride from gases containing silicon fluorine as obtained, for example, during the wet extraction of raw phosphates or when glass bodies are pickled with a mixture of hydrofluoric and sulfuric acids. These gases predominantly contain silicon tetrafluoride, but may also contain hexafluorosiloxane, fluorosilicic acids and hydrofluoric acid.

Silicon tetrafluoride (SiF₄) is used in a variety of ways.

For example, it is used for treating dried concrete parts in order to provide a considerable improvement of their waterproofness and resistance to corrosion and abrasion (G. Roederer, Chim.Ind. (Paris) 84, 912–924, 1960).

It is also used to increase the hydrophobic character of crystalline molecular sieves (European patent application No. 83107533.8).

It is used to produce highly dispersed silicic acid and hydrofluoric acid (U.S. Pat. No. 3,969,485, German Offenlegungsschrift No. 2132426, German Offenlegungsschrift No. 2132428, German Offenlegungsschrift No. 2132429).

It is suitable for producing orthosilicic acid esters (German patent no. 2609767).

High-grade silicon can be obtained from it (German Offenlegungsschrift No. 3206766, A. Sanjurjo et al, J. Electrochem. Soc. 128 (1981) 179–184).

It is also suitable for obtaining amorphous silicon for photo-voltaic cells (cf. for example Makoto Konagai et al, Appl. Phys. Lett. 36 (1980) 599 and A. Madan, S. R. Ovshinsky, E. Benn, Phil.Mag. B 40, 259 (1979)).

It is also used for obtaining silane (D. K. Padma et al, J. Fluorine Chem. 1979, 14(4), 327-9, German patent No. 1034159, German patent no. 1080077, U.S. Pat. No. 2,933,374).

It is also suitable as an etching medium for materials containing silicon in the semiconductor industry (U.S. Pat. No. 4,262,409).

It is already known (Proc.-Fert.Soc. (PFRSAZ) V 163, 1977) to produce silicon tetrafluoride from waste gases which are obtained during the wet extraction of raw phosphates, by hydrolyzing the waste gases and, to dissolve precipitated silicic acid, converting them with waste gases containing hydrofluoric acid into an approximately 20% hexafluosilicic acid solution. This solution is decomposed at 100° to 110° C. in reactors made of nickel alloys with concentrated sulfuric acid to form silicon tetrafluoride which is volatile under these conditions. Hexafluorosilicic acid solution can be added until the concentration of sulfuric acid has decreased to 70 to 75%.

The application of this process is opposed by great problems involving the materials, in view of the corrosiveness of the acid mixtures at the necessary high reaction temperature and the great amount of waste sulfuric acid formed, which is contaminated by fluorine compounds.

The problem on which the invention is based is to provide a process for producing pure silicon tetrafluoride without the simultaneous formation of byproducts which are hardly capable of being used.

The invention is based on the finding that this problem can be solved by converting a hydrolysate obtained by hyrolyzing gases containing silicon fluorine, with sodium fluoride, potassium fluoride or barium fluoride, intoa single product being a corresponding alkali or alkaline earth hexafluosilicate, although the hydrolysate contains complex compounds. The hexafluorosilicate can then be processed further in a simple manner to form pure silicon tetrafluoride.

The object of the invention is a process for producing silicon tetrafluoride, which is characterized in that gases containing silicon fluorine are hydrolyzed, the hydrolysate is reacted with sodium fluoride, potassium fluoride or barium fluoride and the reaction product obtained is decomposed thermally, thereby forming silicon tetrafluoride.

It is particularly advantageous that the metal fluoride which is also formed during thermal decomposition can be recycled.

The inventive process may be illustrated with reference to the following equations.

 (1)

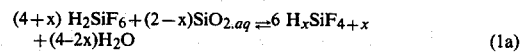 (1a)

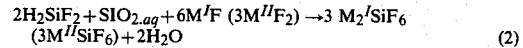 (2)

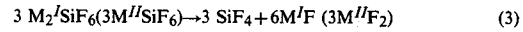 (3)

$M^I$ = Na, K
$M^{II}$ = Ba
x = 0.5 to 2

According to equation (1), the hydrolysis takes place with water. The system hexafluorosilicic acid ($H_2SiF_6$) and hydrated silicic acid ($SiO_{2.aq}$) is in equilibrium with mononuclear complexes of the general formula $H_xSiF_{4+x}$, wherein x attains values of approximately 0.5 to a maximum of 2 as a function of the total concentration of hexafluorosilicic acid. Thus, x=1.1 for 30% $H_2SiF_6$, for example (cf. Ullmann 4th edition Vol. 11 p.614). It is as yet unclear at present, however, to what extent other ligands than F, such as OH or $OH_2$, are coordinated to the mononuclear complexes.

It has now been found that the equilibrium shifts completely to the side of the corresponding hexafluorosilicates when this suspension of silicic acid gel in fluorosilicic acids is stirred with sodium fluoride, potassium fluoride or barium fluoride, the hexafluorosilicates being precipitated as difficultly soluble compounds. The fluorides are preferably used in stoichiometric amounts according to equation (2).

A single defined silicon fluorine compound forms with the hexafluosilicate. The hexafluosilicate is separated, dried and then decomposed thermally, whereby pure silicon tetrafluoride is obtained and the metal fluoride used is recovered and may be returned to the process.

BRIEF DESCRIPTION OF THE DRAWING

The performance of the process shall be explained in more detail with reference to the flow sheet shown in the drawing.

The gas containing silicon fluorine is hydrolyzed with water in a waste gas scrubber. The provenance of the gas containing silicon fluorine is in principle irrelevant. The Si/F ratio of the gases should preferably be between ¼ and 1/5, so that the concentration of hydrofluoric acid in the hydrolysate does not increase too much. In waste gases of acid polishing, in which glass bodies are pickled with a mixture of hydrofluoric and sulfuric acids, the fluorine content may reach values of up to 50 g/Nm$^3$, possibly up to 100 g/Nm$^3$; the Si/F ratio is in the desired range. In apparatus for the wet extraction of raw phosphates, the fluorine content in the waste gas depends upon the quality of raw phosphate used. About 20 g fluorine/Nm$^3$ may be stated as a standard value. The silicon content is frequently less than ¼ or 1/5 the amount of fluorine in gram atoms, also depending on the quality of raw phosphate used. Material containing quartz or silicic acid is then expediently added to the reaction material.

The inventive process may be applied with qualities of silicon tetrafluoride of any concentration, and may thus be applied as a "purification process" at high concentrations.

The hydrolysate obtained is vigorously stirred preferably for ½ to 4 hours in corrosion-resistant agitator vessels with the stoichiometric amount of metal fluoride which comes out of the reactor for thermally decomposing hexafluorosilicate. The metal fluoride may be used in powder form, in solution or—particularly advantageously—as a suspension. The hexafluosilicate obtained in the agitator vessel is separated and dried. The filtrate forming during separation and the waste air obtained during drying may be fed back into the waste gas scrubber. In the process, hexafluorosilicate yields of over 90% are obtained when sodium fluoride and potassium fluoride are used, and yields of about 85% when barium fluoride is used, in each case with respect to the metal fluoride used.

The purity of the alkali hexafluorosilicates which may be obtained is greater than 99%, that of the barium hexafluorosilicate about 90%. The alkali hexafluorosilicates are essentially contaminated by silicic acid and water, the barium hexafluorosilicate additionally by barium fluoride, above all.

The dried hexafluorosilicates are decomposed thermally to form silicon tetrafluoride and metal fluoride, maintaining a corresponding underpressure. This pressure is maintained by pumping out the silicon tetrafluoride as it is obtained. The following decomposition conditions have proved useful:
for Na$_2$SiF$_6$, 100 mbar at 600° C.
for K$_2$SiF$_6$, 100 mbar at 550° C.
for BaSiF$_6$, 100 mbar at 500° C.
Conditions of 0.1 to 500 mbar and 400° to 800° C. may generally be used. The silicon tetrafluoride obtained has at least a purity greater than 90 vol. %, preferably 95 vol. % and in particular greater than 99 vol. %. The purity of the silicon tetrafluoride obtained depends essentially on the leakage rate of the decomposition apparatus, whereby qualities of SiF$_4$ with a purity greater than 99 vol. % may easily be attained. The contamination is essentially air and traces of hexafluosiloxane, hydrofluoric acid and sulfuric dioxide. The metal fluoride obtained during the thermal decomposition is fed back into the process and added in doses to the hydrolysate of waste gases containing silicon fluorine in the agitator vessel.

The particular advantages of the inventive process lie in its economy and ecological value. The process is economical because it proceeds from virtually worthless waste gas scrubber liquids which form in very large amounts and must not by any means be let into the outfall ditches, for ecological reasons.

The whole process can be performed with apparatus which is in principle known and tested industrially. No reactors of expensive non-ferric alloys are necessary.

The process is ecologically useful because it allows for pure silicon tetrafluoride to be obtained from waste gases, all necessary adjuvants being conducted in a cyclic process. No substances which need to be disposed of are formed, which is particularly advantageous in view of the physiological effectiveness of fluorine compounds.

The invention shall be explained in more detail by the following example.

EXAMPLE

Waste gases from an acid polishing unit in which glass bodies are pickled with a mixture of hydrofluoric and sulfuric acids, were hydrolyzed in a centrifugal scrubber. 800 l of this hydrolysate, a suspension of gelatinous silicic acid in fluorosilicic acids with a total content of 94.68 g F/l and 33.34 g Si/l, were transferred to an agitator vessel, mixed with 80 kg ground sodium fluoride, vigorously stirred for 2 hours and filtered off. The filtrate was conducted back into the waste gas scrubber and the filter cake put through a fluid bed drying apparatus. 169 kg sodium hexafluosilicate in powder form was obtained at a yield of 94% of the theory with respect to the sodium fluoride used, and with a content of 99.5% sodium hexafluosilicate. The waste air from the drying apparatus was conducted into the centrifugal scrubber. 40 kg of the sodium hexafluorosilicate obtained were filled into a non-scaling steel drum and decomposed thermally to form sodium fluoride and SiF$_4$ in the course of 2 hours at 620° C. and a pressure less than 200 mbar, maintained by pumping out.

21.7 kg SiF$_4$ were obtained, i.e. 98% of the theory with respect to the sodium hexafluosilicate used, with a content of 99 vol. %. The following impurities were found:
air: 0.6 vol. %
Si$_2$OF$_6$: 0.2 vol. %
SO$_2$: <0.005 vol. %.

I claim:
1. A process for producing silicon tetrafluoride comprising hydrolyzing gases containing silicon fluorine, reacting the hydrolysate with a member selected from the group consisting of sodium fluoride, potassium fluoride and barium fluoride and thermally decomposing the reaction product thus obtained thereby forming silicon tetrafluoride
2. The process according to claim 1, wherein the metal fluoride which forms during the thermal decomposition is recycled.

* * * * *